US006802518B2

(12) United States Patent
Kuntz

(10) Patent No.: US 6,802,518 B2
(45) Date of Patent: Oct. 12, 2004

(54) WHEELCHAIR ACCESS SYSTEM

(75) Inventor: James P. Kuntz, Spokane, WA (US)

(73) Assignee: PortaCare, LLC, Spokane, WA (US)

(*) Notice: Subject to any disclaimer, the term of this patent is extended or adjusted under 35 U.S.C. 154(b) by 0 days.

(21) Appl. No.: 10/283,014

(22) Filed: Oct. 28, 2002

(65) Prior Publication Data

US 2004/0080137 A1 Apr. 29, 2004

(51) Int. Cl.$^{7}$ .................................................. B62D 1/00
(52) U.S. Cl. ................................. 280/250.1; 280/149.2
(58) Field of Search ........................... 280/149.2, 250.1, 280/287, 278, 288.4, 650, 642, 643, 648, 647, 638, 304.1; 297/DIG. 4, DIG. 10; 108/44, 49; 5/81.1 R, 81.1 HS

(56) References Cited

U.S. PATENT DOCUMENTS 5,076,390 A * 12/1991 Haskins ................... 280/250.1
5,476,241 A * 12/1995 Helman ................... 248/286.1
5,884,929 A * 3/1999 Kincaid ................... 280/304.1
6,464,243 B2 * 10/2002 Roche ........................ 280/650

* cited by examiner

*Primary Examiner*—Lesley D. Morris
*Assistant Examiner*—Tony Winner
(74) *Attorney, Agent, or Firm*—Holland & Hart

(57) ABSTRACT

A wheelchair access system includes a wheelchair having a frame, rear wheels, front wheels, a seat, and a backrest. An extension extending rearwardly of the wheelchair frame includes a bracket coupled to an adjacent rear wheel, which allows the rear wheel to be moved horizontally away from the side of the wheelchair seat. A platform, coupled to a slide bracket attached to the wheelchair, can be positioned to the side of the wheelchair to facilitate access into and out of the wheelchair. The wheelchair access system is designed so that the physically impaired can access the wheelchair without the assistance of another person.

26 Claims, 11 Drawing Sheets

WHEELCHAIR ACCESS SYSTEM

FIELD OF THE INVENTION

This invention relates to wheelchairs, and more particularly to wheelchair access systems.

BACKGROUND OF THE INVENTION

Wheelchair access (i.e., entry into or exit from a wheelchair) has always been a challenge for the physically impaired. Typically, a physically impaired person has to be lifted out of and into a wheelchair by one or more people prior to and immediately after use of the wheelchair.

The requirement that another person, at least, assist an invalid in accessing a wheelchair can be inconvenient at best and can have a completely isolating effect at worst. The concept of a wheelchair itself is to allow the invalid to be independent in traveling from one place to another. An ideal access system should likewise promote and enable the invalid to act alone and achieve a high degree of independence.

Systems have been developed over the years to allow access into and out of a wheelchair from one side of the wheelchair. For example, U.S. Pat. Nos. 3,901,527 and 4,155,588 disclose systems for moving a rear wheel relative to the seat of the wheelchair and moving the chair armrest to allow access into and out of the wheelchair from the side. Notwithstanding the improvements provided by these devices, they still require a person other than the physically impaired to move the wheel and assist in accessing the wheelchair.

There is a need, therefore, to provide an access system for wheelchairs that facilitates access into and out of the wheelchair. There is further a need to provide a wheelchair access system that improves upon the concept of side access to a wheelchair. Still further, there is a need to develop wheelchair access systems that can be employed solely by the invalid or other person utilizing the wheelchair.

SUMMARY OF THE INVENTION

The present invention relates to a wheelchair access system that facilitates access into and out of a wheelchair. The system allows the user, without help from another person depending on his or her disabilities, to move either of the large, rear wheels backward, away from the side of the seating area so that the wheelchair seat can be accessed from that particular side. More specifically, the wheelchair access system comprises a horizontal rearwardly extending frame attached to the main frame of the wheelchair. This rear extension comprises a pair of horizontal guide rails. An extension, according to the present invention, may be attached to one or both sides of a wheel chair.

A sliding bracket interconnects a rear wheel of the wheelchair to the horizontal guide rails. The sliding bracket includes a linear bearing that allows it to move along the horizontal guide rails. A latch secures the front-to-rear position of the wheel. That is, the wheel can be secured in place at an operable, forward position or, alternatively, at a rearward position to allow side access into and out of the wheelchair.

A platform may be attached to the frame of the wheelchair for positioning to the side of the wheelchair when the rear wheel is moved to its rearward-most position on the extension. A glide slide allows the platform to be raised relative to the wheelchair and articulated or otherwise positioned to the side of the wheelchair, perhaps extending to a seat or other piece of furniture laterally adjacent the wheelchair. The invalid or physically impaired person utilizing the wheelchair can then slide into or out of the wheelchair from the side. A primary benefit of the present invention is that the wheelchair user can move the rear wheel and position the board without the assistance of another person.

The foregoing and other features, utilities, and advantages of the invention will be apparent from the following detailed description of the invention with reference to the accompanying drawings.

DETAILED DESCRIPTION OF THE INVENTION

Figure 1:
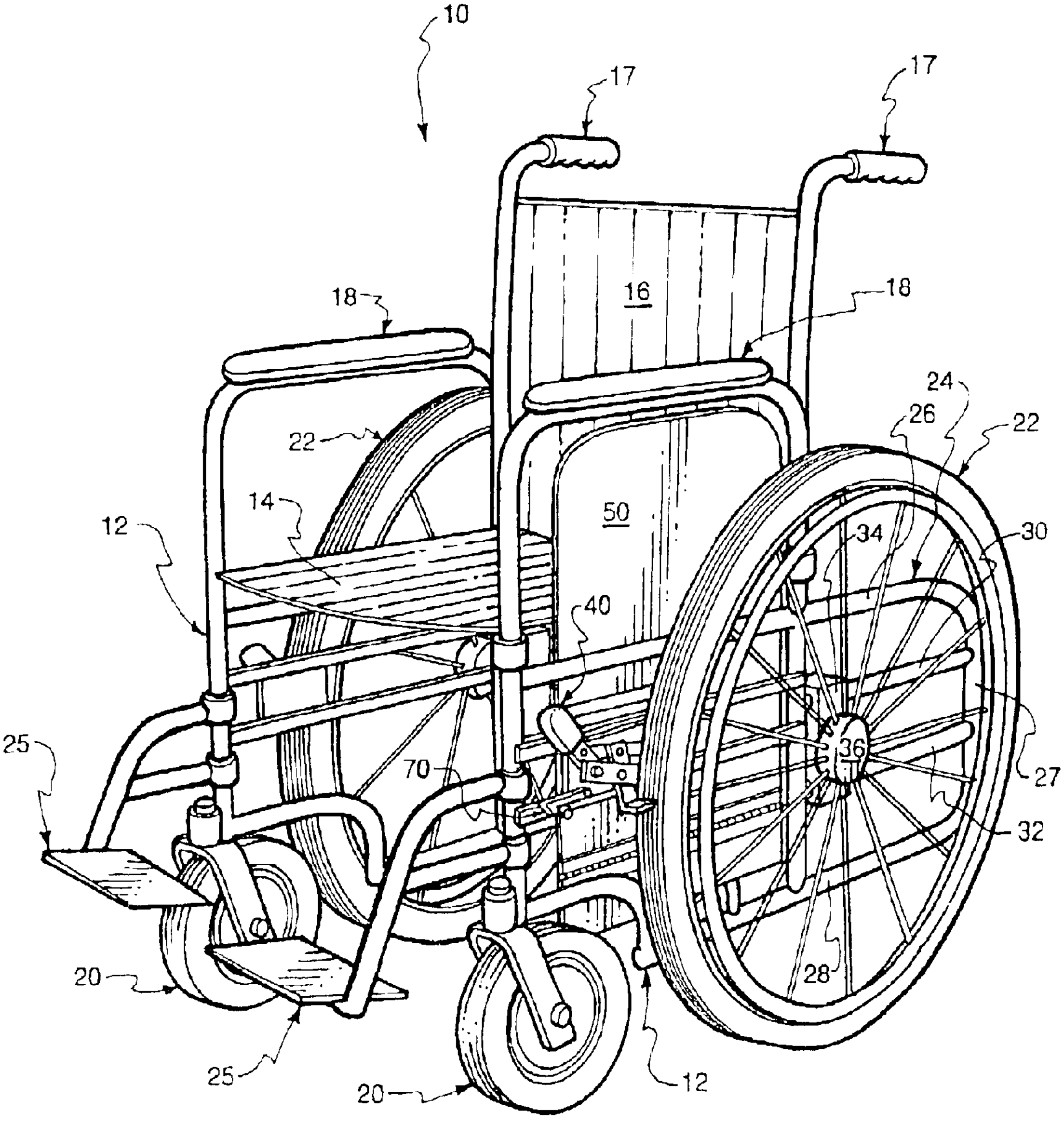
FIG. 1 is a perspective view of a wheelchair apparatus including a wheelchair access system according to the present invention.

The present invention relates to a wheelchair access system incorporated into a wheelchair 10 comprising a wheelchair frame 12, which is more or less conventional, except for the modifications and improvements described herein. A conventional seat 14, a backrest 16, rear handles 17, armrests 18, front wheels 20, rear wheels 22, and foot rests 25 are attached to the frame. As discussed below, a primary benefit of the improved wheelchair according to the present invention is that it facilitates wheelchair access from the side (i.e., access into or out of the wheel chair from one side of the wheelchair). Such side access can be much easier than, for example, access solely from the front of the wheelchair. Perhaps more importantly, the wheelchair access enhances the independence of the wheelchair user so that he or she may, depending on the particular physical disabilities involved, be able to move into and out of a wheelchair without the assistance of another.

An extended frame or extension 24 is coupled to the standard wheelchair frame 12 and extends back behind the wheelchair. An extension 24 may be attached to one side or both sides of the wheelchair 10. The extension frame 24 extends in a rearward direction relative to the standard portions of the wheelchair beyond the portion of the frame that corresponds to the backrest 16. More specifically, as shown in FIG. 1, each frame extension section 24 comprises a top rail 26, a bottom rail 28, and a vertical end rail that forms the outer periphery of frame extension 24. Horizontal guide rails 30, 32 are coupled between top rail 26 and bottom rail 28. A bracket 34 is coupled to guide rails 30, 32. Bracket 34 is in the form of a block and houses two linear bearing assemblies that extend over rails 30, 32. The bracket 34 interconnects horizontal guide rails 30, 32 and the rear wheel 22 at hub 36. The rails 30, 32 provide a horizontal track along which wheel 22 can be moved. The guide bearings housed by block or bracket 34 slide along the rails 30, 32 to move the wheel 22 relative to the standard portion of wheelchair.

Figure 3:
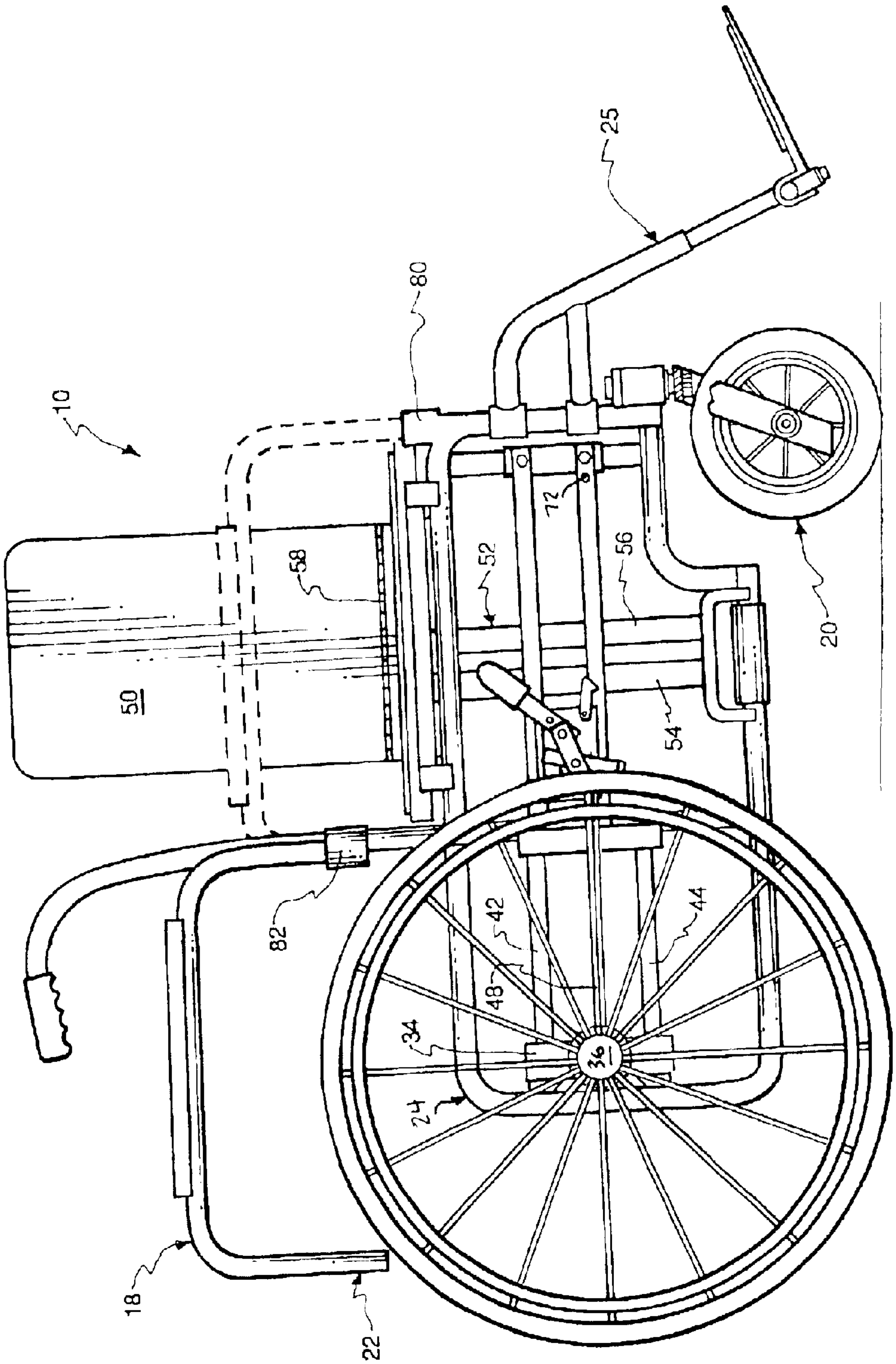
FIG. 3 is a side elevation view of the wheelchair apparatus of FIG. 1 with the armrest rotated backward and the side platform raised for pivoting and placing in position to the side of the wheelchair.

When the wheel is in the forward-most position, as shown in FIG. 1, the wheelchair is ready to transport a person. When the wheel 22 is in a rearward-most position, as shown in FIG. 3, side access into and out of the wheelchair 10 can be achieved or facilitated. The wheel 22 can be moved by releasing the standard wheelchair brake 40 (described below), releasing latch mechanism 70 (described below), and rolling the wheel 22 either rearward or forward relative to the wheelchair frame 12. The bracket 34, including the linear bearing assemblies incorporated into bracket 34, allows the rear wheel 22 to be moved horizontally via horizontal guide rails 30, 32 with only minimal effort being required. Typically the wheel 22 is simply rolled back along rails 30, 32 by the person using the wheelchair 10.

With the wheel 22 at a rearward-most position, as shown in FIG. 3, the armrest 18 may thereafter be articulated out of the way by first lifting the armrest out of front armrest socket 80 and pivoting the armrest 18 rearwardly relative to rear armrest socket 82 to move it away from the side of the wheelchair 10. Those skilled in the art will understand that other attachment methods and mechanisms may be used to facilitate movement of one or both armrests 18 away from the side of wheelchair 10 without departing from the scope of the present invention. Although FIG. 1 shows only one movable armrest, movable armrests (with associated platforms 50) may be employed on each side of the wheelchair.

Figure 2:
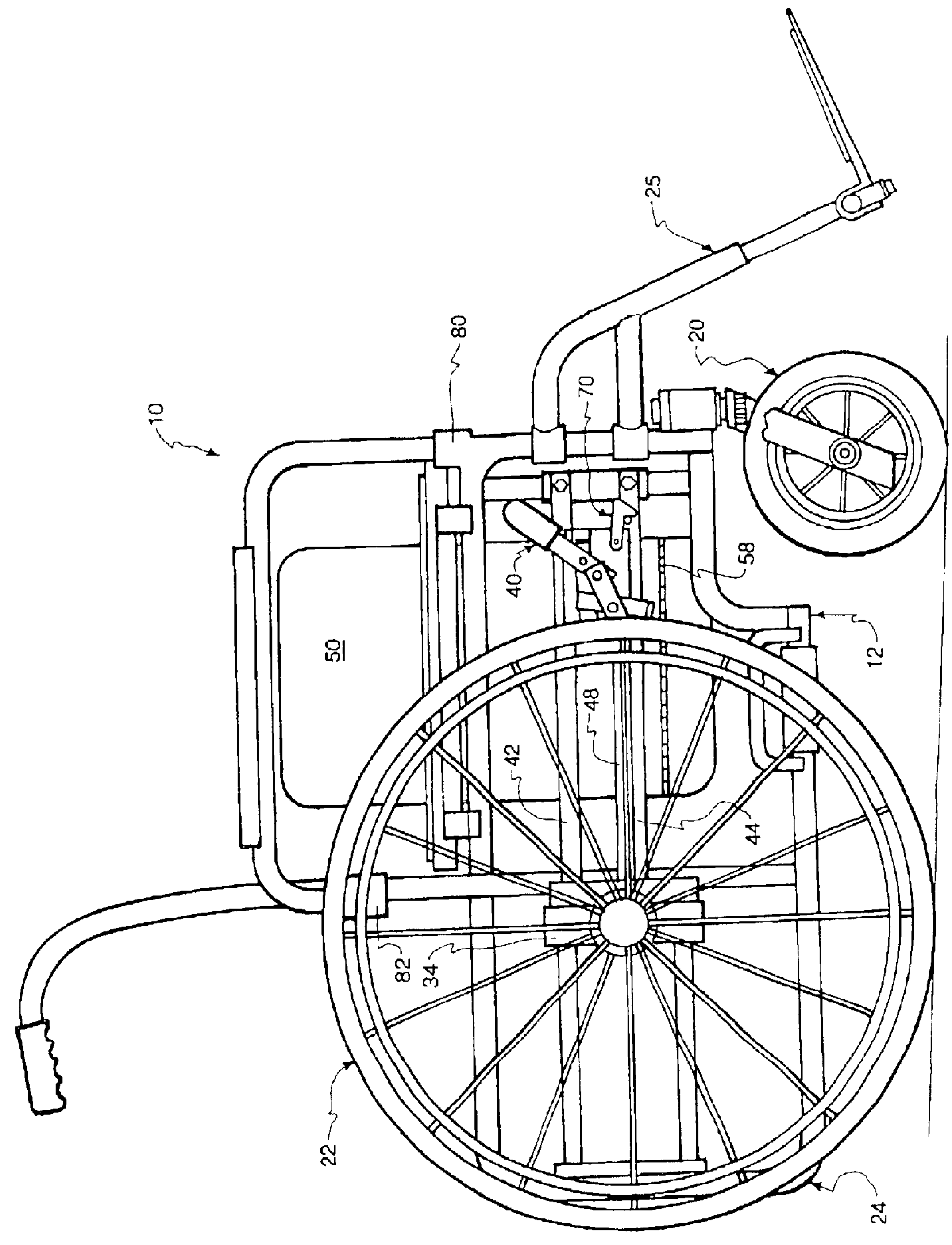
FIG. 2 is a side elevation view of the wheelchair apparatus of FIG. 1 with the armrest in its operative position and the side platform stowed at the side of the wheelchair so that the wheelchair can be used to transport a person.
Figure 8:
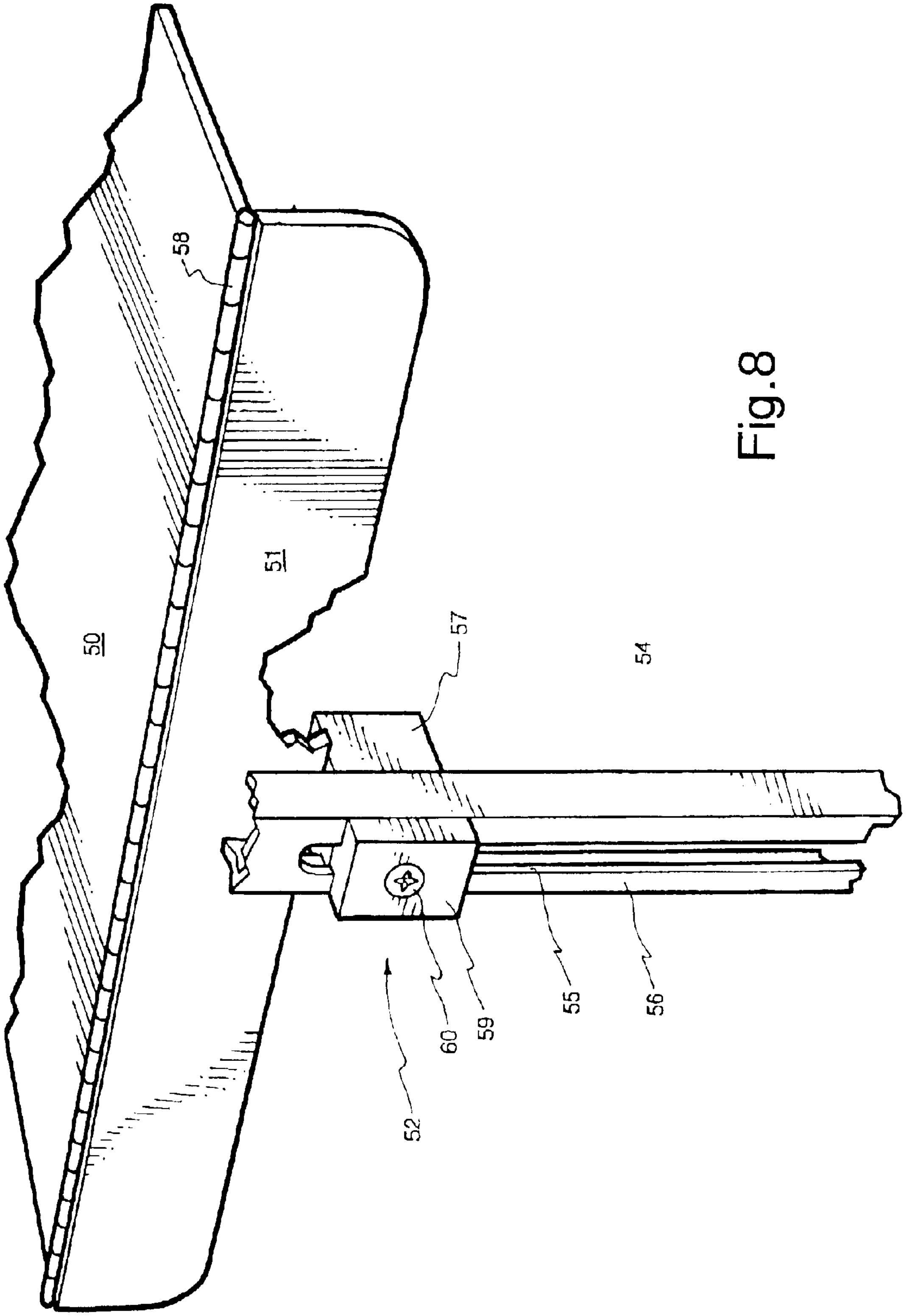
FIG. 8 is a partial perspective view of one embodiment of the platform and its associated slide bracket assembly utilized to stow and alternatively employ the platform at the side of the wheelchair for access into and out of the wheelchair apparatus of FIG. 1.

After armrest 18 has been moved away from the side of the wheelchair 10, the platform or side extension board 50 can be operatively positioned to facilitate access into and out of the wheelchair 10. The platform 50 is first raised by pulling the platform up along slide bracket 52. Slide bracket 52 may comprise a plurality of vertical arms or brackets 54, 56 (as shown in FIGS. 2 and 3), or may comprise a single vertical rod comprising opposed sides 54, 56, as shown in FIG. 8. Those skilled in the art will understand an appropriate way to provide a slide bracket 52 for platform 50. In one embodiment, shown in FIG. 8, a slide bracket 52 is provided which comprises a vertical bar having a first side 54 and a second side 56, both of which are generally configured as L-shaped brackets in cross section such that the vertical post has an overall U-shaped cross-sectional configuration. Vertical bracket 54 and vertical bracket 56 define an elongated vertical slot 55 which extends along the entire length of the vertical bar of the slide bracket 52. A slide block 52 comprising a base portion 57 and a top portion 59 are interconnected by a fastener 60. Slide block portions 57 and 59 are secured together so that they ride inside of slot 55. Slide block elements 57, 59 move up and down within slot 55 so that the platform 50 can be moved up and down relative to the wheelchair frame, to which the vertical stationary bracket, including vertical sides 54, 56, is coupled.

A stationary flange 51 is coupled to the base 57 of the slide block portion of bracket 52. Stationary flange 51 may be mounted to block 57 in any appropriate way desired by those skilled in the art. After the platform 50 has been fully extended (as shown in FIG. 3), platform 50 is articulated (as shown in FIG. 8) about hinge 58 and relative to flange 51 so that the platform 50 extends laterally outwardly from the wheelchair 10 to span a distance between the wheelchair 10 and a piece of furniture next to the wheelchair 10. In one embodiment, platform 50 may be made of fiberglass and is approximately 17 inches in length.

Figure 5:
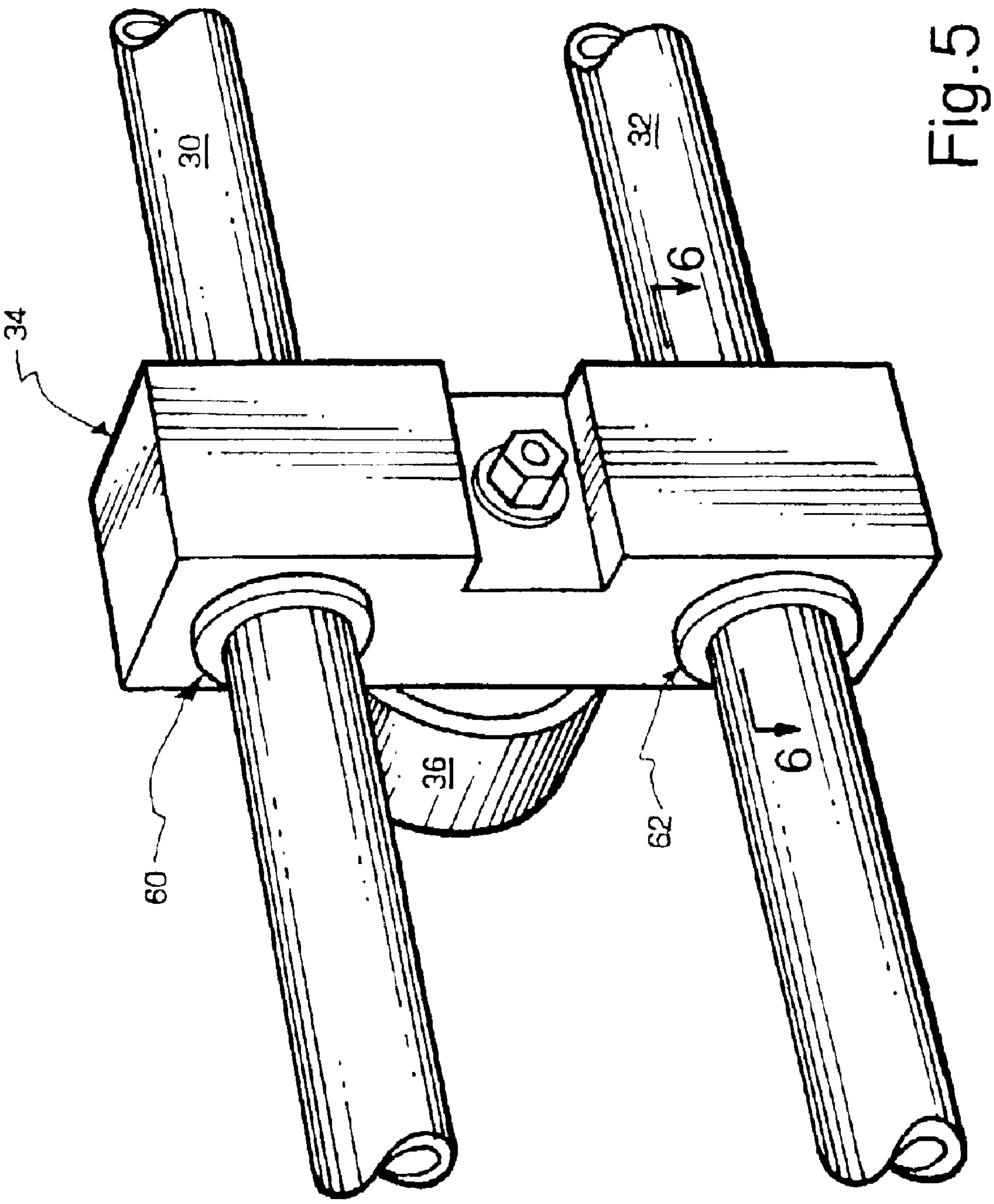
FIG. 5 is a perspective view of a sliding bracket which interconnects the rear wheel to the rearwardly frame extension of the wheelchair apparatus of FIG. 1.
Figure 6:
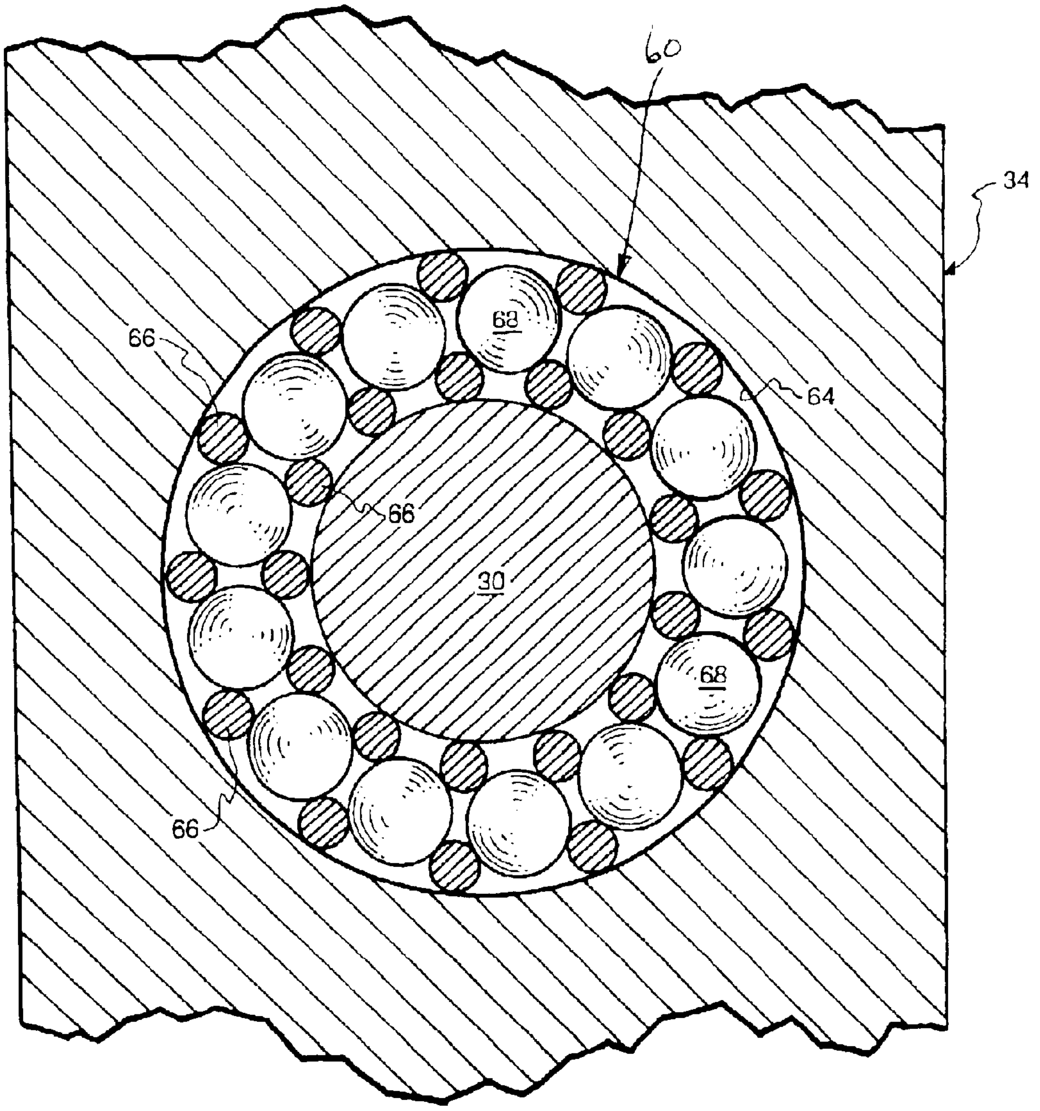
FIG. 6 is a partial sectional view of the bearing assembly housed by the sliding bracket of FIG. 5.

FIGS. 5 and 6 show the details of the horizontal slide bracket 34, which allows the rear wheel assembly (only hub 36 of the rear wheel assembly is shown in FIG. 5) to be moved horizontally relative to the wheelchair frame 12 on the extension 24. The block or slide bracket 34 is made, in one embodiment, out of aluminum and is approximately 1½ inch×1½ inch×4¾ inches in dimension. The block or slide bracket 34 houses a pair of linear bearings 60, 62, which allow the block bracket 34 to slide relative to guide rails 30, 32. It is to be understood that a single guide rail 30 or 32 may be utilized, and that guide rails 30, 32 (with an associated bracket 34), may be utilized on each side of the wheelchair 10, without departing from the scope of the present invention. In the embodiment of FIGS. 1 and 5, for example, two guide rails 30, 32 are utilized in combination with two linear bearings 60, 62 which allow the slide bracket 34 to move relative to guide rails 30, 32.

With reference to FIG. 6, the slide bracket 34 houses linear bearing 60 which more specifically comprises an aperture 64 which provides sufficient space for a plurality of hardened and ground rods 66 in combination with a plurality of hardened and ground balls 68. The combination of rods 66 and balls 68 allow the slide bracket 34 to move relative to guide rail 30.

Figure 4:
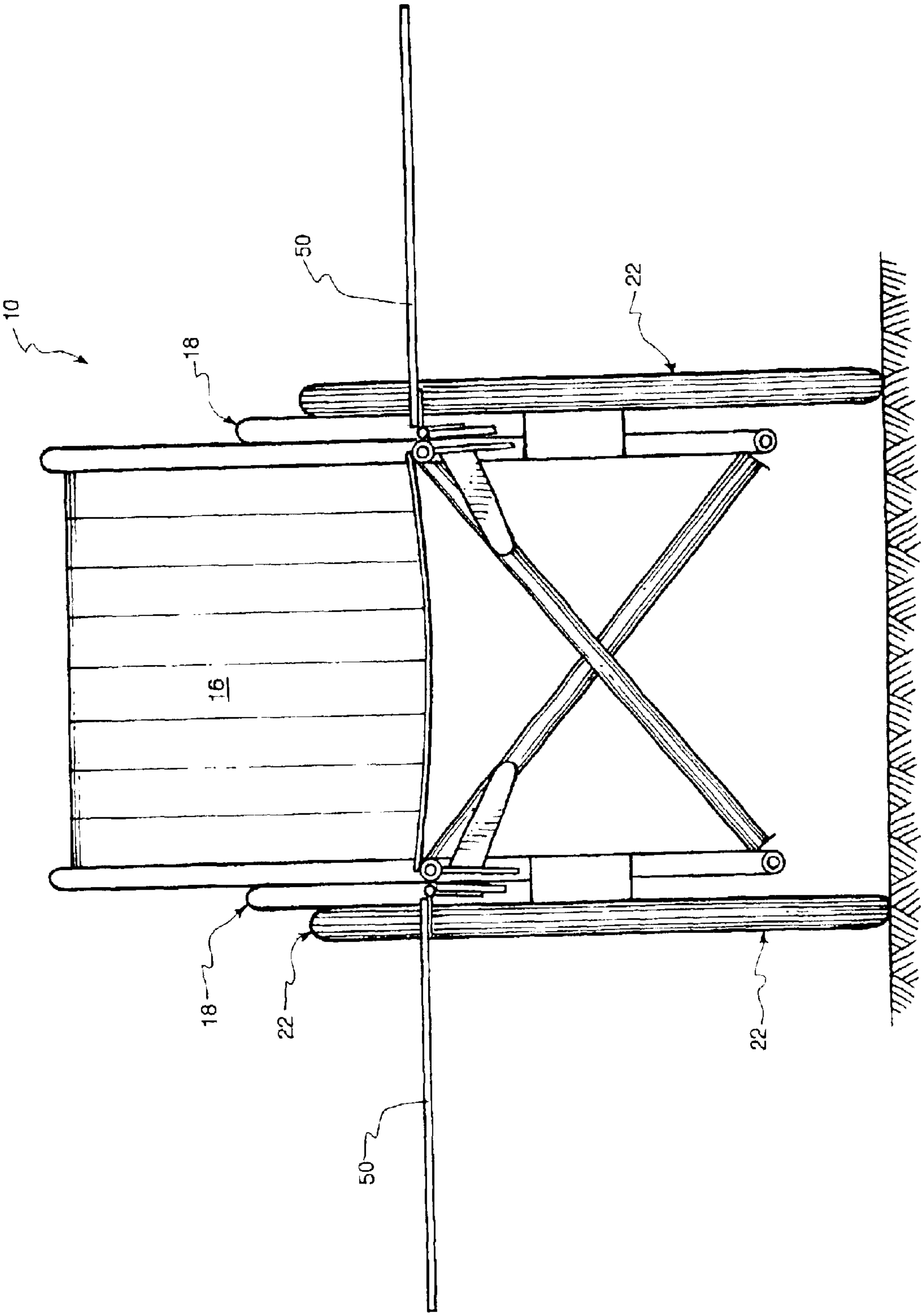
FIG. 4 is a front view of the wheelchair apparatus of FIG. 1 with platforms attached to both sides of the wheelchair and shown in their laterally extended positions.

As shown in FIG. 4, a wheelchair 10 according to the present invention may incorporate a platform 50 on one or both sides of the wheelchair. By incorporating a platform on both sides of the wheelchair, the physically impaired person would be able to pull up to the right side or to the left side of an appropriate seating arrangement adjacent the wheelchair and position the appropriate platform 50 for access into and out of the wheelchair 10. If the wheelchair incorporates two side platforms 50, the other structures and configurations of the wheelchair access system, as shown, for example, in FIG. 1, would be incorporated on both sides of the wheelchair.

Figure 7:
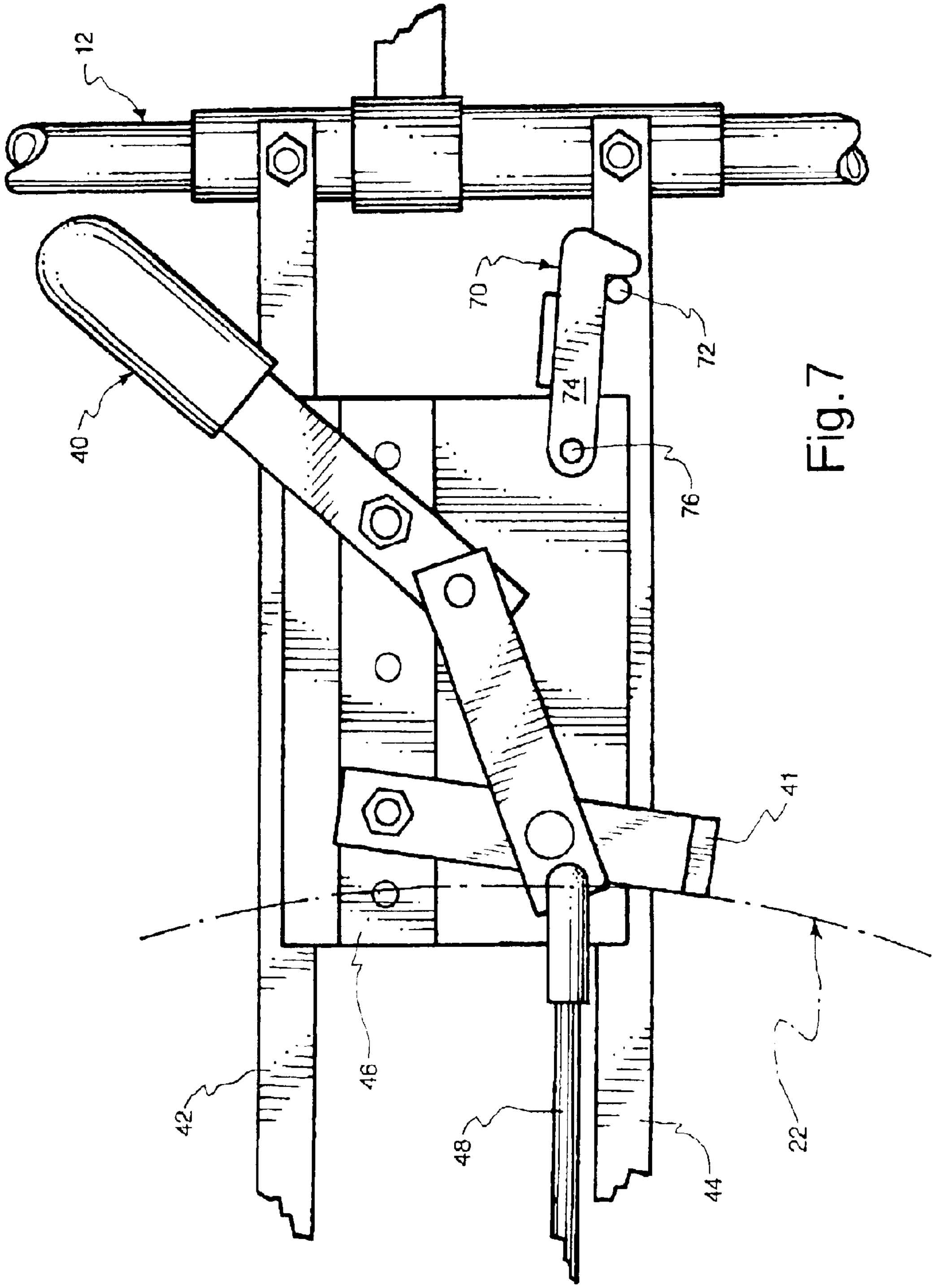
FIG. 7 is a side elevation view of the wheel brake and the wheel latch mechanisms incorporated into wheelchair apparatus of FIG. 1.

A latch system 70 is shown in FIG. 7. The latch system 70 maintains the wheel 22 in a forward, operable position on the wheelchair when the platform 50 is not being used. A stationary post 72 is attached to a horizontal bar 44 which is incorporated into the wheelchair frame 12. A top bar 42 is similarly attached to wheelchair frame 12. Top bar 42 and bottom bar 44 provide a mounting location for a movable brake base 46 to which a standard brake 40 is attached. When the lever of brake 40 is moved in a forward position, horizontally disposed brake lever 41 engages tire 22 to prevent the wheel from rolling relative to the wheelchair frame 12. A rod 48 interconnects the brake base 46 and the wheel (including slide bracket 34) so that the entire wheel 22, slide block 34, and brake mounting base 46 move back and forth relative to extension frame 24. When the wheel is moved to the forward most position, as shown in FIG. 1, a latch arm 74, which pivots about axis 76 hooks around stationary post 72 to lock the wheel in an operable position relative to wheelchair frame 12. The arm 74 may be biased such that its engagement with stationary post 74 remains constant, unless the bias force is overcome by rotating the arm 74 upward. When latch arm 74 is raised and disengaged from post 72, the rear wheel and attached brake base 46 can be moved rearwardly relative to the wheelchair frame 12.

Figure 9:
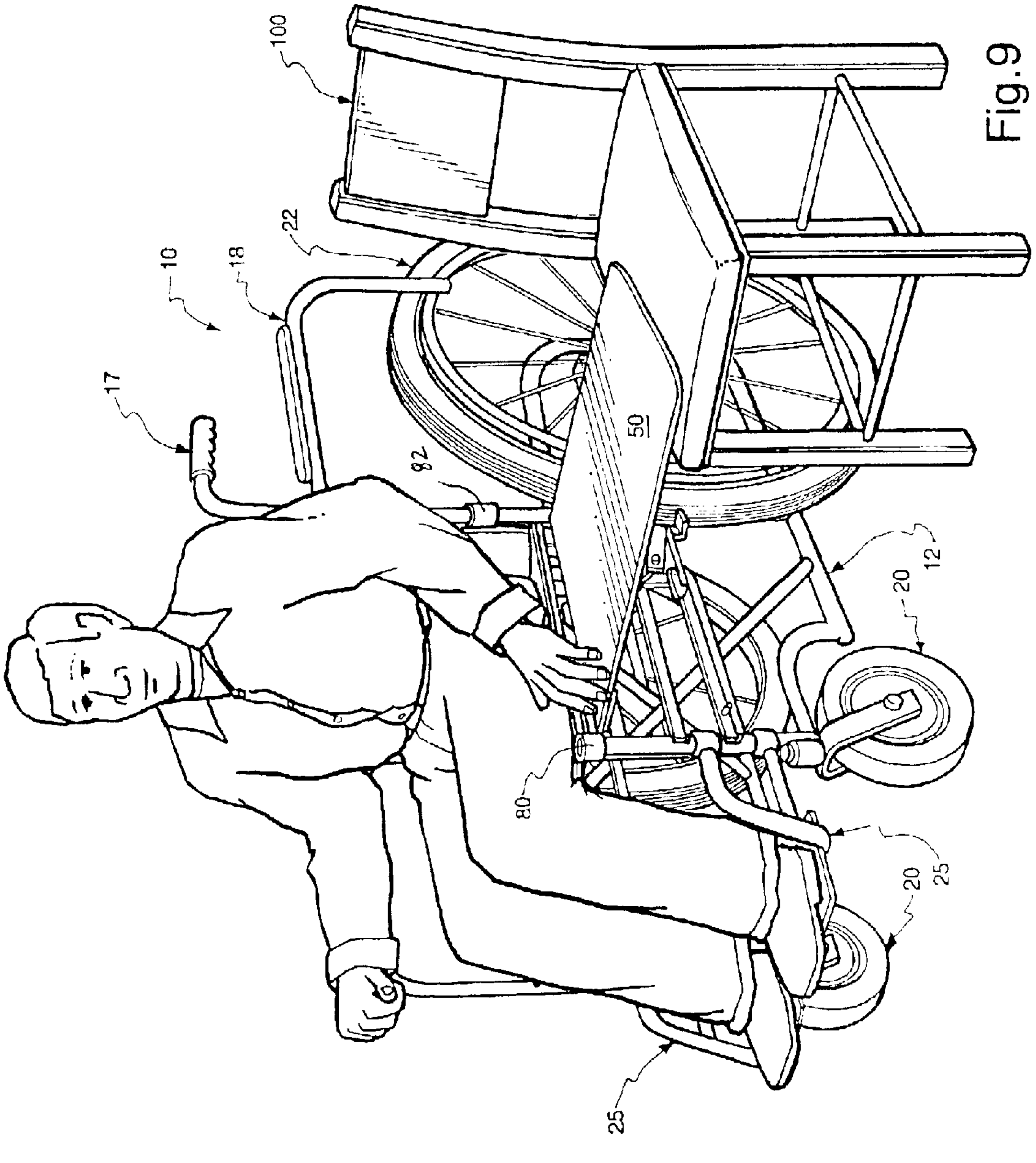
FIG. 9 is a perspective view showing a person sitting in the wheelchair apparatus of FIG. 1 with the rear wheel located at its rearward-most position on the extension and the platform extending to the side of the wheelchair to allow access into and out of the wheelchair from or to a piece of furniture laterally adjacent the wheelchair.

In operation, as shown in FIG. 9, a user of wheelchair 10 will articulate armrest 18 out of the way by lifting armrest 18 out of socket 82 and pivoting armrest 18 relative to coupling 82. The platform 50 is then raised and pivoted relative to its hinge so that the platform extends laterally to one side of the wheelchair and spans a distance between the wheelchair 10 and a piece of furniture, such as a chair 100. The physically impaired may then be able to shift his or her weight onto platform 50 and ultimately onto chair 100 to exit the wheelchair. When the person desires to once again access the wheelchair, the person reverses this process to move from the chair 100 onto the platform 50, and eventually back into wheelchair 10.

Figure 10:
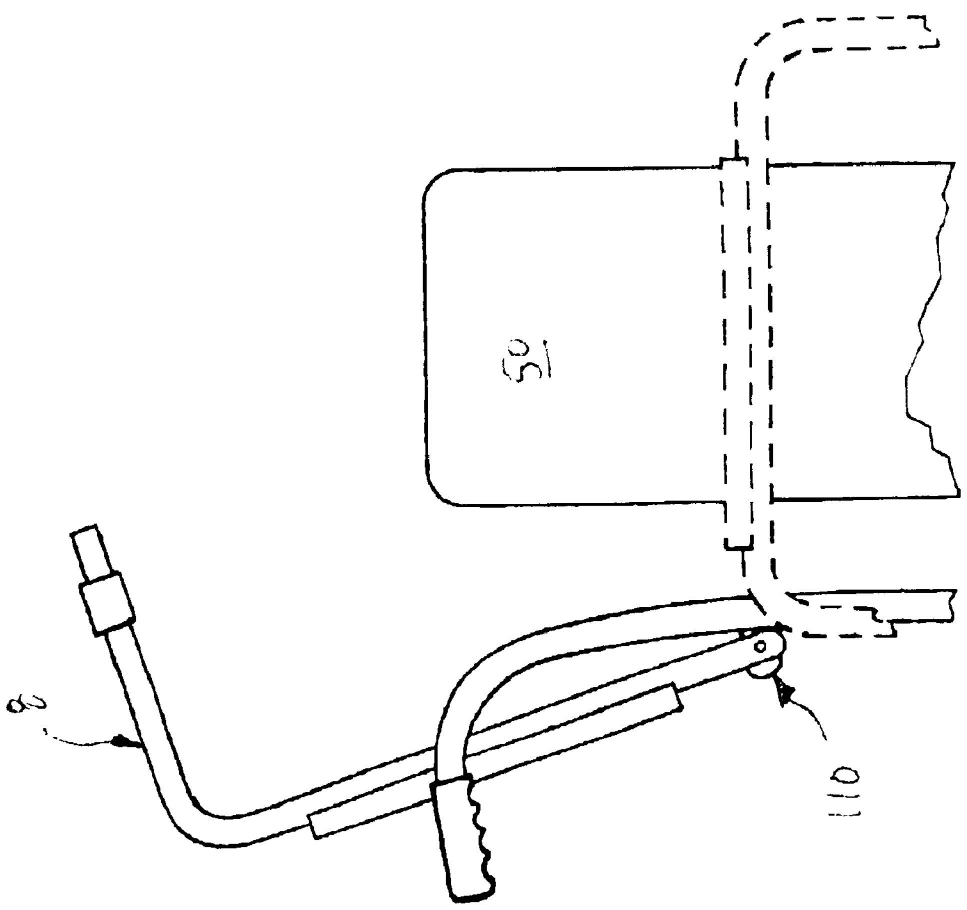
FIG. 10 is a side elevation view of an alternative embodiment of a wheelchair armrest shown in a raised position relative to its normal in-use position.

FIG. 10 shows an alternative embodiment of the wheelchair armrest 18. To articulate armrest 19 out of the way so that platform 50 can be positioned to the side of wheelchair 10 (as shown in FIG. 9), a pivot bracket 110 allows the armrest to be pivoted in an upward arcing manner until platform 50 is able to clear the in-use location of the armrest 18. By utilizing an armrest 18 according to the embodiment of FIG. 10, a user of the wheelchair can pull up next to a laterally adjacent structure (any structure whatsoever) and the arm 18 can pivot upwardly about pivot bracket 110 and avoid the structure next to the wheelchair.

Figure 11:
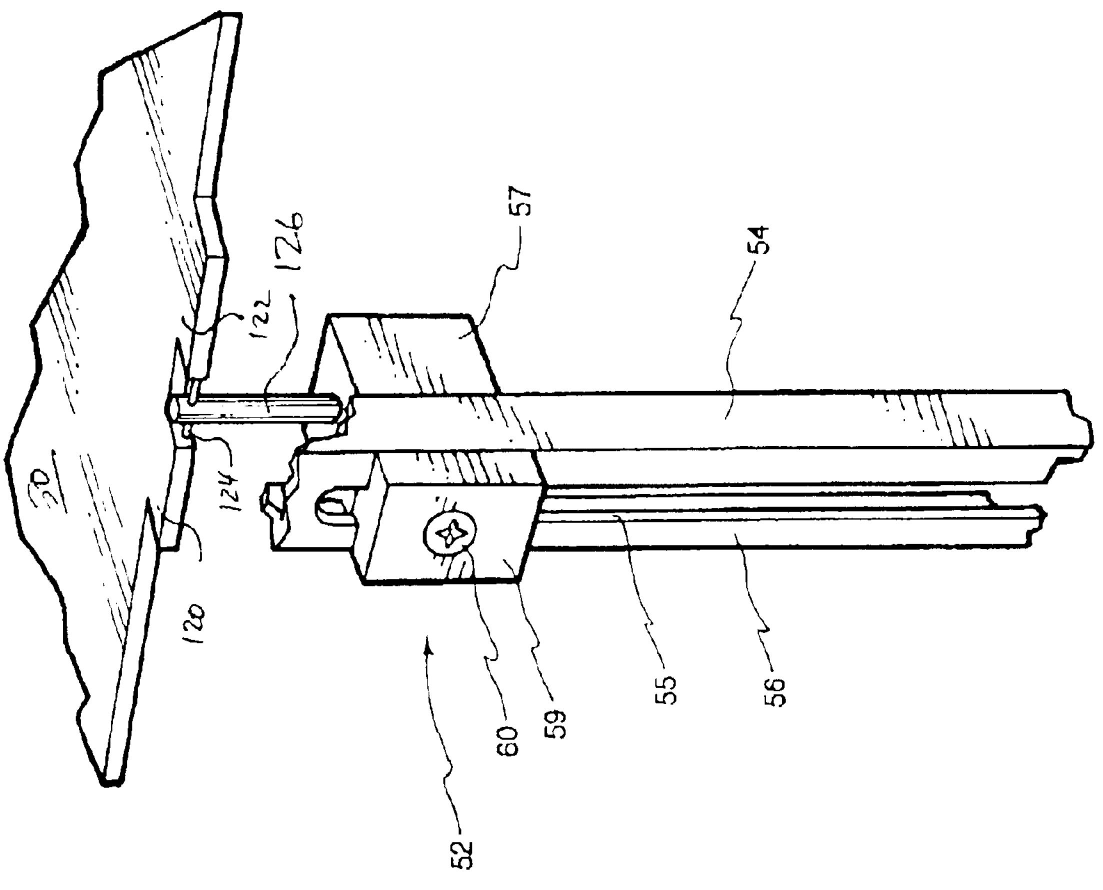
FIG. 11 is a perspective view of an alternative embodiment of the platform and its associated slide bracket assembly utilized to stow and alternatively employ the platform at the side of the wheelchair for access into and out of the wheelchair apparatus of FIG. 1

FIG. 11 shows an alternative embodiment of slide bracket 52. The vertical bar comprising left and right side portions 54, 56 and central aperture 55 are the same as the embodiment of FIG. 8. With respect to the platform 50, however, rearwardly extending flanges 120, 122 are provided. Flanges 120, 122 include appropriately sized apertures to hold a pin 124 which extends through a cylindrical body 126 (which could alternatively have other cross-sectional shapes) or other hinge device which interconnects the platform 50 and the movable base 57 of slide bracket 52. Cylinder 126 is inserted into a similarly sized aperture formed in base 57 (FIG. 11 shows the cylinder 126 extending above base 57 so that the interconnection can be shown). When fully installed, cylinder 126 slides down into the aperture formed in base 27 and the top of base 57 supports the underside of both extension flanges 120, 122. When the platform 50 is to be stowed, the platform pivots about pin 124 (which necessarily will raise the cylinder 126 relative to base 57 so some degree) and the platform 50 can be lowered via slide bracket 52 to a side of the wheelchair as shown in FIG. 1.

A primary benefit of the present invention is that the user of the chair can use the wheelchair access system without the assistance of another person. Once the brake 40 is released, the wheel 22 can simply be rolled backward such that horizontal slide bracket or block 34 slides along horizontal rails 30, 32 to the rearward-most location on rear frame 24. Only ounces of torque are required to move the wheel rearward via horizontal bracket 34. The brake 40 is again set. The armrest 18 then can be articulated away from the immediately adjacent side of seat 14. Thereafter, platform or board 50 can be raised (via slide bracket 52) and articulated over to span the gap that would otherwise exist between the wheelchair and an immediately adjacent side seating area. All of this can be done with the physically impaired person sitting in the chair, and there is no need for the person to place his or her hands any farther back than approximately the location of the backrest of the wheelchair.

While this invention has been described with reference to certain specific embodiments and examples, it will be recognized by those skilled in the art that many variations are possible without departing from the scope and spirit of this invention. The invention, as defined by the claims, is intended to cover all changes and modifications of the invention which do not depart from the spirit of the invention. The words "including" and "having," as used in the specification, including the claims, shall have the same meaning as the word "comprising."

What is claimed is:

1. A wheelchair access system, comprising:

a frame and a seat coupled to the frame, a pair of front wheels rotatably coupled to the frame;

a horizontal guide rail coupled to at least one side of the frame;

a pair of rear wheels, at least one of the rear wheels rotatably coupled to the guide rail;

wherein the at least one of the rear wheels is movable horizontally along the guide rail without any elevational changes to the frame such that the at least one rear wheel can be moved away from a side of the wheelchair to allow access into and out of the wheelchair from the side.

2. A wheelchair access system according to claim 1, further comprising a bracket interconnecting the at least one rear wheel and the guide rail.

3. A wheelchair access system according to claim 1, further comprising a platform coupled to the frame, the platform being movable relative to the frame and extendable laterally adjacent the seat of the wheelchair when the rear wheel is moved away from the side of the wheelchair, the platform spanning a distance between the wheelchair and a piece of furniture laterally adjacent the wheelchair.

4. A wheelchair access system according to claim 1 wherein the guide rail comprises a pair of horizontal rails coupled to the frame.

5. A wheelchair access system according to claim 1 wherein the guide rail comprises a pair of horizontal rails coupled to the frame, and further comprising a bracket interconnecting the rear wheel and the horizontal rails, the bracket moving horizontally relative to the rails to move the rear wheel away from the side of the wheel chair.

6. A wheelchair access system according to claim 1, further comprising a latch to secure the wheel relative to the frame.

7. A wheelchair access system according to claim 1, further comprising a wheel lock to hold the at least one rear wheel in a forward, operating position when the wheelchair is ready for use.

8. An access system for a wheelchair, comprising:

an extension securable to a frame of a wheelchair, a bracket coupled to the extension, the bracket connecting a rear wheel of a wheelchair to the extension, the bracket only being movable horizontally on the extension to move the rear wheel relative to the wheelchair frame without any change in wheelchair elevation to facilitate entry into and exit from a wheelchair from the side.

9. A wheelchair access system according to claim 8 wherein the extension comprises a pair of horizontal rails securable to the wheelchair frame, wherein the bracket is secured to the horizontal rails to allow the rear to move exclusively in a horizontal direction relative to the wheel chair frame.

10. A wheelchair access system according to claim 8, further comprising a platform securable to the wheelchair frame, the platform being alternatively stowable on the wheelchair or positionable to a side of the wheelchair to allow side access to the wheelchair.

11. A wheelchair access system according to claim 8, further comprising a platform coupled to the frame, the platform being movable relative to the frame and extendable laterally adjacent the seat of the wheelchair when the rear wheel is moved away from the side of the wheelchair, the platform spanning a distance between the wheelchair and a piece of furniture laterally adjacent the wheelchair.

12. A wheelchair access system according to claim 8 wherein the extension comprises a pair of horizontal rails coupled to the frame.

13. A wheelchair access system according to claim 8 wherein the extension comprises a pair of horizontal rails coupled to the frame, and further comprising a bracket interconnecting the rear wheel and the horizontal rails, the bracket moving horizontally relative to the rails to move the rear wheel away from the side of the wheel chair.

14. A wheelchair access system according to claim 8, further comprising a latch to secure the wheel relative to the frame.

15. A wheelchair access system according to claim 8, further comprising a wheel lock to hold the wheel in a forward, operating position when the wheelchair is ready for use.

16. A method of facilitating access into and out of a wheelchair, comprising:

providing a wheelchair comprising a frame and a seat coupled to the frame, providing a pair of front wheels rotatably coupled to the frame;

providing a horizontal slide bracket coupled to at least one side of the frame;

providing only a single pair of rear wheels, at least one of the pair of rear wheels being coupled to the horizontal slide bracket;

moving the at least one of the pair of rear wheels only horizontally relative to the frame between forward and rearward positions to allow side access into and out of the wheelchair.

17. The method of claim 16, further comprising positioning a platform to the side of the wheelchair to facilitate side access into the wheelchair.

18. A wheelchair, comprising:

a frame and a seat coupled to the frame, a pair of front wheels rotatably coupled to the frame;

a horizontal guide rail coupled to at least one side of the frame;

a single pair of rear wheels only, at least one of the rear wheels rotatably coupled to the guide rail;

wherein the at least one of the rear wheels is movable only horizontally along the guide rail such that the at least one rear wheel can be moved away from a side of the wheelchair to allow access into and out of the wheelchair from the side.

19. A wheelchair according to claim 18 wherein the at least one of the rear wheels is movable along the guide rail without any elevational changes to the frame.

20. A wheelchair access system, comprising:

a frame and a seat coupled to the frame, a pair of front wheels rotatably coupled to the frame;

a horizontal guide rail coupled to at least one side of the frame;

a pair of rear wheels, at least one of the rear wheels rotatably coupled to the guide rail;

wherein the at least one of the rear wheels is movable horizontally along the guide rail such that the at least one rear wheel can be moved away from a side of the wheelchair to allow access into and out of the wheelchair from the side;

a bracket interconnecting the at least one rear wheel and the guide rail, the bracket comprising a linear bearing to allow the bracket to move along the guide rail.

21. A wheelchair access system, comprising:

a frame and a seat coupled to the frame, a pair of front wheels rotatably coupled to the frame;

a horizontal guide rail coupled to at least one side of the frame;

a pair of rear wheels, at least one of the rear wheels rotatably coupled to the guide rail;

wherein the at least one wheel is movable horizontally along the guide rail such that the at least one rear wheel can be moved away from a side of the wheelchair to allow access into and out of the wheelchair from the side;

wherein the guide rail comprises a pair of horizontal rails coupled to the frame, and further comprising a bracket interconnecting the rear wheel and the horizontal rails, the bracket comprising a linear bearing to allow the bracket move along the rails such that the at least one rear wheel can be rolled back behind the wheelchair.

22. A wheelchair access system, comprising:

a frame and a seat coupled to the frame, a pair of front wheels rotatably coupled to the frame;

a horizontal guide rail coupled to at least one side of the frame;

a pair of rear wheels, at least one of the rear wheels rotatably coupled to the guide rail;

wherein the at least one wheel is movable horizontally along the guide rail such that the at least one rear wheel can be moved away from a side of the wheelchair to allow access into and out of the wheelchair from the side;

a platform and a slide bracket interconnecting the platform with the wheelchair frame, the slide bracket allowing the platform to be articulated between stowed and deployed conditions.

23. A wheelchair access system comprising:

an extension securable to a frame of a wheelchair;

a bracket coupled to the extension, the bracket connecting a rear wheel of a wheelchair to the extension, the bracket being movable horizontally on the extension to move the rear wheel relative to the wheelchair frame to facilitate entry into and exit from a wheelchair from the side;

wherein the extension comprises a pair of horizontal rails securable to the wheelchair, wherein the bracket is secured to the horizontal rails, the bracket comprising a pair of linear bearings to allow horizontal movement of the bracket along the horizontal rails.

24. A wheelchair access system, comprising:

an extension securable to a frame of a wheelchair;

a bracket coupled to the extension, the bracket connecting a rear wheel of a wheelchair to the extension, the bracket being movable horizontally on the extension to move the rear wheel relative to the wheelchair frame to facilitate entry into and exit from a wheelchair from the side;

a bracket interconnecting the rear wheel and the extension, the bracket comprising a linear bearing to allow the bracket to move along the extension.

25. A wheelchair access system, comprising:

an extension securable to a frame of a wheelchair;

wherein the extension comprises a pair of horizontal rails coupled to the frame, and further comprising a bracket interconnecting a rear wheel of the wheelchair and the horizontal rails, the bracket comprising a linear bearing to allow the bracket to move along the rails such that the rear wheel can be rolled back behind the wheelchair to facilitate entry into and exit from the wheelchair from the side.

26. A wheelchair access system comprising:

an extension securable to a frame of a wheelchair;

a bracket coupled to the extension, the bracket connecting a rear wheel of a wheelchair to the extension, the bracket being movable horizontally on the extension to move the rear wheel relative to the wheelchair frame to facilitate entry into and exit from a wheelchair from the side;

a platform and a slide bracket interconnecting the platform with the wheelchair frame, the slide bracket allowing the platform to be articulated between stowed and deployed conditions.

* * * * *